United States Patent Office 2,945,100
Patented July 12, 1960

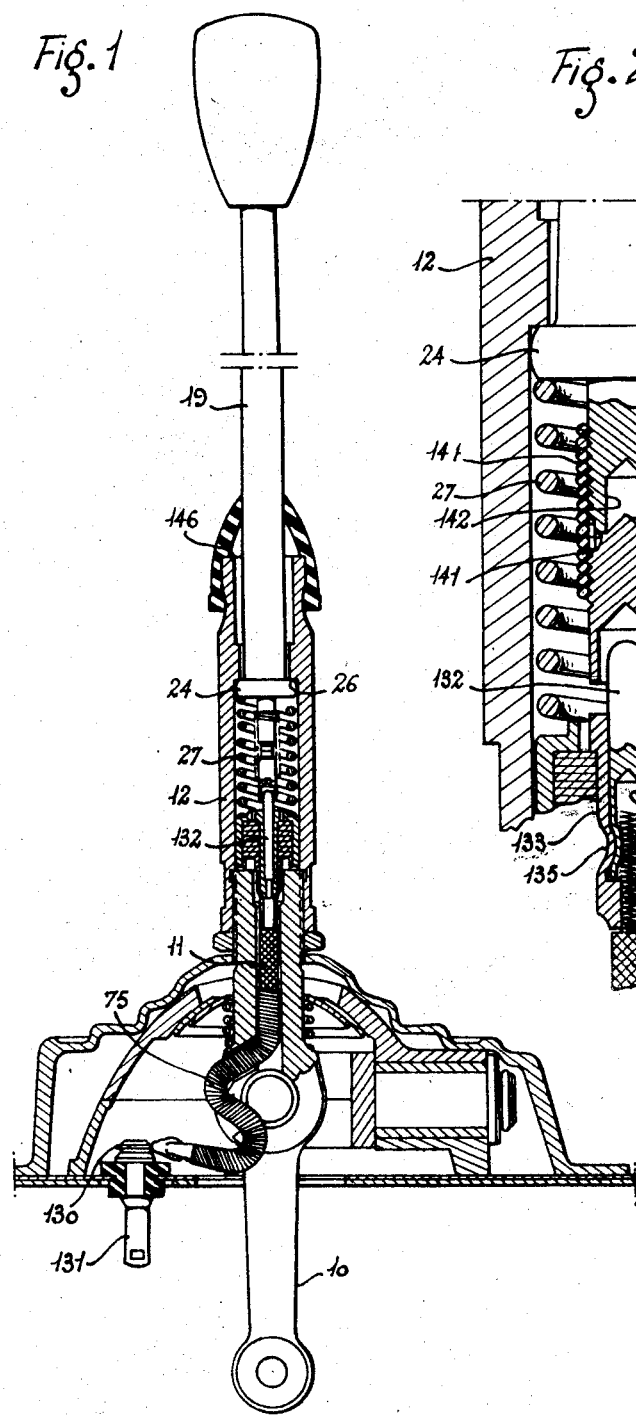
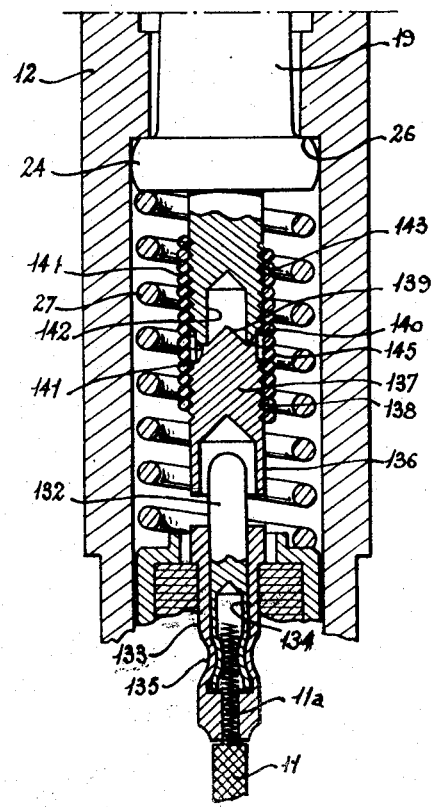

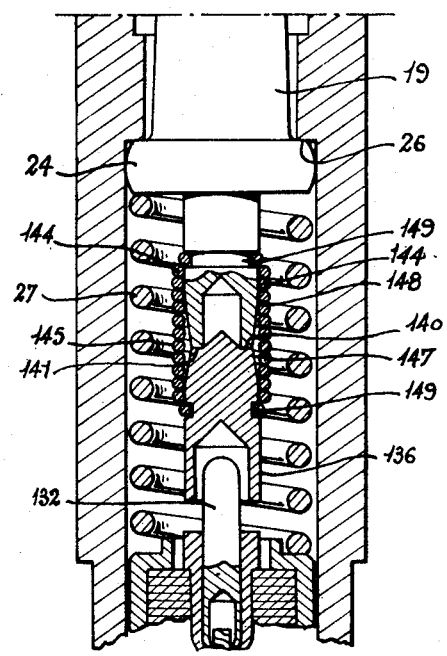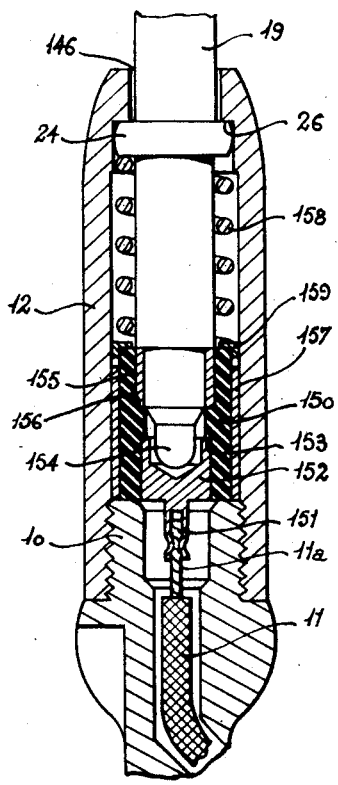

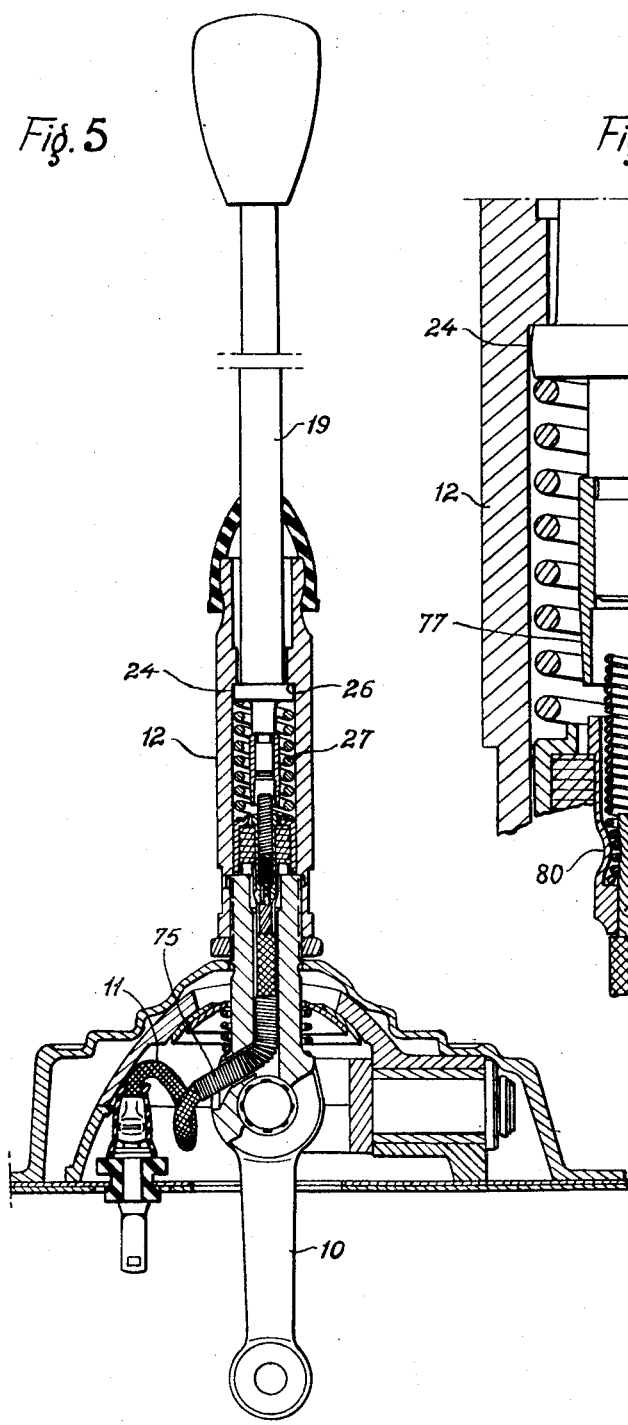
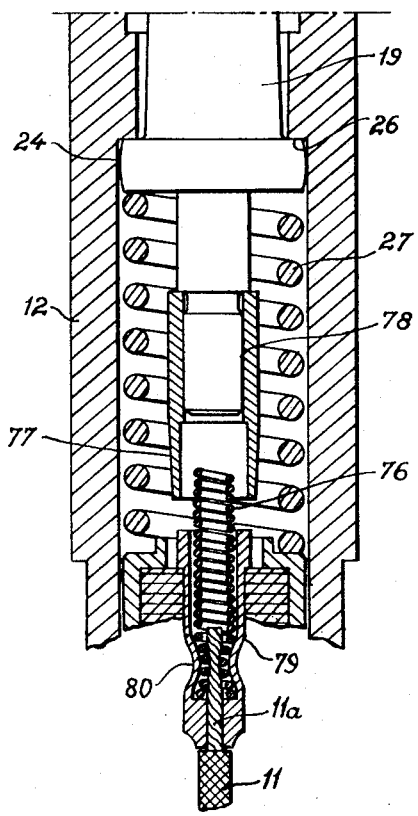

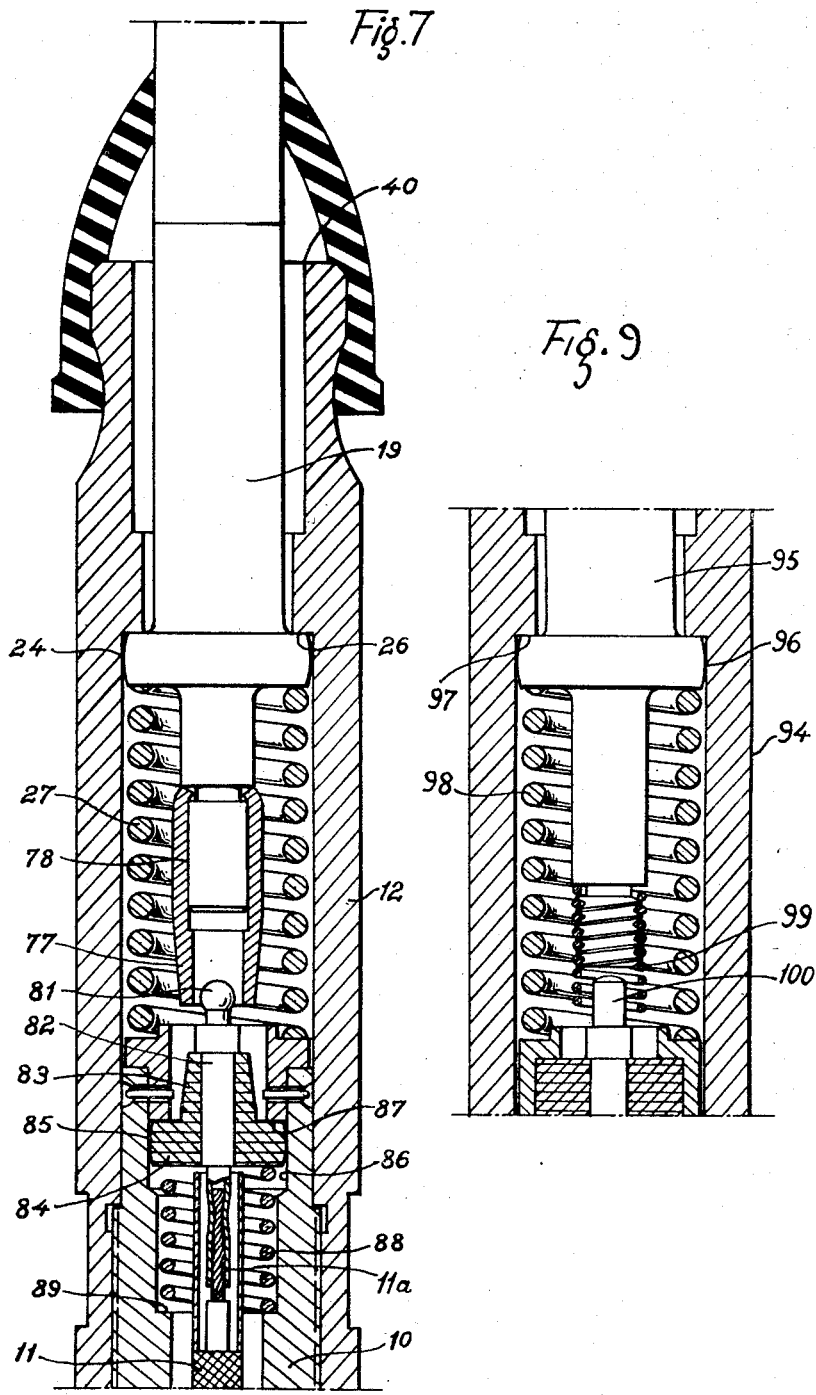

2,945,100
GEAR-CHANGING CONTROL

Jean Maurice and Michel Rist, Paris, France, assignors to Societe Anonyme Francaise du Ferodo, Paris, France, a corporation of France Filed Feb. 14, 1956, Ser. No. 565,479

Claims priority, application France Feb. 14, 1955

8 Claims. (Cl. 200—61.88)

The present invention relates to a control for changing gears, especially for automobile vehicles, of the type in which an electric switch is associated with the said control and operates the clutch of the vehicle.

One of the objects of the present invention is a gear-changing control of this type, in which the contacts of the switch are held respectively centered in a perfect manner and without any risk of false contact, when the gear lever is not actuated.

Forms of embodiment of a control in accordance with the invention are described below by way of example, reference being made to the attached drawings, in which:

Fig. 1 is a general view in longitudinal cross-section of a lever in accordance with the invention;

Fig. 2 is a view to a larger scale of a part of this lever;

Figs. 3 and 4 are similar to Fig. 2, but relate respectively to two alternative forms, Fig. 4 being on a smaller scale than Fig. 3;

Fig. 5 is a general view in longitudinal cross-section of a further alternative form of lever;

Fig. 6 is a view to a larger scale of a part of this further alternative form;

Fig. 7 is a view similar to that of Fig. 6 but relating to a still further alternative embodiment;

Fig. 9 is a view to a larger scale of a part of this member;

Figure 8:
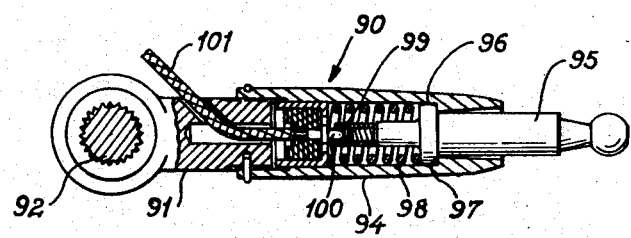
Fig. 8 is a view in longitudinal cross-section of a member of the rod gear for changing gears in accordance with the invention.

Reference will first of all be made to Figs. 1 and 2, in which there is shown a gear-changing lever in accordance with the invention, the electric contact of which is incorporated in the lever itself rather than in the rod system. There can be seen at 10 in Figs. 1 and 2, a control member which is connected to earth and which actuates the rod system of the gear-box, at 11 is shown a conductor of the electric circuit associated with the clutch of the vehicle, at 12 a conducting hollow socket screwed on the member 10, at 19 an operating rod orientatably mounted in the socket 12 through the medium of a spherical bearing surface 24, of an abutment 26 and of a spring 27 intended to return the rod 19 to the centered position in the socket 12.

The conductor 11 which is fitted at least in part with an elastic lining, 75, for example helicoidal, is fixed by means of a thimble 130 to one terminal 131 fixed to the floor. At its other extremity, the conductor 11 is connected to a rigid contact 132. The latter is housed and centered along a substantial length in a socket 133. The socket 133 is mounted in an insulated manner on the member 10 and/or on the member 12. The base of the socket 133 acts as an abutment for the contact 132 and is drilled so as to receive the core 11a of the conductor 11. This conductor 11a is engaged in the interior of the contact 132 which is suitably drilled for that purpose at 134. The concentric assembly formed by the socket 133, the contact 132 and the core 11a is inset at 135, which ensures a perfect method of fixing and an excellent connection. The core 11a is preferably constituted in accordance with the invention by a conducting helicoidal spring (see Fig. 2) so as to follow the deformations to which it may be subjected without ever passing beyond its elastic limit.

The projecting portion having a rounded end, of the male contact 132 is engaged in the interior of a female associated contact 136. The upper part 137 of the rigid tubular contact 136 is full and is externally threaded at 138. The upper extremity of the part 137 comprises a central conical projection 139 surrounded by an annular flat peripheral bearing surface 140. The surface 140 is applied against an associated annular bearing surface 141 formed at the lower end of the rod 19, whilst the projection 139 is engaged in a central bore 142 formed in accordance with the said end in the interior border of the said annular bearing surface 141. A threaded portion 143, identical with the threading 138, is formed round the lower part of the rod 19, and a single spring 144 is screwed around the threaded parts 138 and 143. In the vicinity of the zone of application of the surfaces 140 and 141, the threaded portions 138 and 143 are removed so as to lay bare a few turns 145 of the spring 144. These turns are thus free to move in all directions so as to ensure the freedom of movement of the contact 136 with respect to the rod 19.

As long as the lever 19 is not handled, the tension of the spring 27 holds the flange 24 closely applied in abutment at 26 and this, by virtue of the spherical bearing surface of the said flange 24, ensures a perfect centering of the lever 19 with respect to the contact 132. In addition, the tension of the spring 144 holds the surfaces 140 and 141 closely applied together, and this again ensures, by virtue of the cone 139, a perfect centering of the tubular contact 136 with respect to the lever 19. This results in an irreproachable centering of the contacts 136 and 132, without any risk of accidental contact.

When the lever 19 is actuated between a centered position such as that shown in Figs. 1 and 2, and a position in which the lever 19 comes into mechanical abutment against the mouth 146 of the member 12, the flange 24 moves away at one point from the abutment 26 and elastically deforms the restoring spring 27. As long as the tubular contact 136 has not touched the contact 132, the spring 144 does not open at 145 and the surfaces 140 and 141 remain everywhere applied together, whilst maintaining the contact 136 in the alignment of the lever 19. When the contact 136 comes up against the contact 132, the electrical contact is established. The contact 136 remains floating between the member 19 which pushes it at one end, and the contact 132 which holds it at the other end. The projection 139 retains the members 136 and 19, the one with respect to the other, whilst the surfaces 140 and 141 move away from each other at one point, with a corresponding opening of the turns 145. This moving away and this opening become accentuated up to the moment when the lever 19 comes into abutment at 146. The contact then remains continuously established at 136, 132, even after the abutment at 146, and is only broken when the lever 19 is released. The springs 17 and 144 then bring back the entire system into the centered position, as shown in Fig. 2.

Reference will now be made to Fig. 3, in which the arrangement is similar to that which has just been described with reference to Figs. 1 and 2, except that the threaded portions 138 and 143 are dispensed with and are respectively replaced by frusto-conical cylindrical walls 147 and 148 which converge towards the zone of application 140, 141. These walls 147 and 148 thus enable the spring 144 to be readily engaged around them and also frees a few turns 145 at the mid-point of the said spring 144. The spring 144 is positioned at its ends by engagement on the cylindrical parts of the walls 147 and 148 and by engagement in the annular grooves 149 of the members 19 and 136. The operation is similar to that of the lever shown in Figs. 1 and 2.

In another alternative form of embodiment (see Fig. 4), the spring 144 is replaced by a tubular member of elastic material 150 in the general construction of the lever, of which in addition a number of other details have been modified. As can be seen from Fig. 4, the core 11a of the conductor 11 is inset in a hollow extension 151 of a female contact 152 which is inserted by force into the interior of the tubular member 150. The axial position of the contact 152 is defined with respect to the member 150 by abutment against an internal shoulder 153 of this latter. The male contact 154 which cooperates with the female contact 152 is formed at the end of the lever 19 and is surmounted by an enlarged and/or lined cylindrical part 155. The part 155 is set in the member 150 opposite the contact 152, and is positioned on the said member by abutment against an internal shoulder 156 of this member. The member 150, the external surface of which is provided with a lining 157 is tightly engaged inside the member 12 until it abuts against the extremity of the member 10.

The operation is similar to the cases which have been previously described, the member 150 performing in this case at the same time the function of the return spring 144 for the moving contact, and the function of the return spring 27 of the rod 19.

If need be, a spring 158 may be provided between the flange 24 and a washer 159 placed on the member 150, so as to create an elastic pre-compression of this member.

Reference will now be made to Figs. 5 and 6, in which the conductor 11 is again provided with an elastic helicoidal casing 75 at the point where it is engaged in a passage of the member 10, but in this case the conductor 11 is connected to an elastic contact 76 (see Fig. 6). This contact 76 is formed by a helicoidal spring engaged inside a hollow member 77 in the shape of a ring. The member 77 is fitted at 78, preferably by insetting, on the lower end of the rod 19 and forms the second contact of the electric contacts actuated by the lever.

The spring 76 which is given a considerable length, is closely housed inside a socket 79. The base of this socket serves as an abutment for this spring, and is drilled to receive the core 11a of the conductor 11. This core 11a is engaged in the interior of the spring 76. The concentric assembly formed by the socket 79, the spring 76 and the core 11a is inset at 80, this ensuring efficient fixing and good connection. It will be appreciated that the considerable length of the spring 76 permits of a perfect centering of the latter with respect to the ring 77 in the position of rest. The operation of this embodiment will readily be followed by what has gone before.

Reference will now be made to Fig. 7. The contact corresponding to the rod 19 is formed, as in the case of Fig. 6, by a ring 77 fitted at 78 on the end of the rod 19, preferably by insetting. The other contact is formed by a small ball 81 engaged inside the ring 77 and formed at the end of a finger 82 which terminates in a tubular portion. The latter receives the core 11a of the conductor 11 and is inset with this core at a suitable point. The finger 82 is carried in an insulating block 83. The block 83 has an enlarged lower flange 84, the lateral external face 85 of which is a part of a sphere. The spherical face 85 is applied against the cylindrical bore 86 of the member 10 so that the block 83 which carries the ball-contact 81 is orientable in all directions with respect to the member 10. The flange 84 abuts against a shoulder 87 of the member 10 and is retained under the action of a spiral spring 88. The latter is supported against a further shoulder 89 of the member 10. It will be noted that a mounting of this kind of the block 83 at 85 with respect to the member 10 is similar to that of the rod 19 at 24 with respect to the socket 12. This mounting ensures an accurate centering of the bore 81 with respect to the ring 77, whilst the considerable size of the spring 88 prevents the bore 81 from being set in vibration and from causing untimely contacts.

In the forms of embodiment which have just been described, the electric contact associated with the clutch of the vehicle is applied to the gear-changing lever itself which is actuated by the user. In the alternative forms of embodiment which will now be described, the electric contact is applied to the rod system which couples the gear-changing lever to the sliding gears of the gear-box.

In the alternative form shown in Figs. 8 and 9, there will be seen in Fig. 8 at 90 an intermediate lever of the rod system which controls the movements of the sliding gears of the gear-box. Such a lever 90 may, as in a known type of rod system, be provided substantially parallel to the gear-changing lever and may be mounted with the latter on a shaft 922 parallel to the stearing column (not shown). The mechanism of the rod system is such that the lever 90 rotates, when the gear-changing lever is moved between a neutral position and an engaged gear position or vice versa, but not when the lever is moved between two neutral positions, with a view to the selection of the sliding gear to be actuated. In this latter case, the lever 90 is simply subjected to a movement of translation during which no appreciable stress is applied to it.

On the base 91 of the lever 90 is screwed a socket 94 (see Figs. 8 and 9), which in accordance with an arrangement similar to that shown in Fig. 5, receives an orientatably-mounted rod 95 provided with a spherical bearing surface 96, an abutment 97, and a return spring 98.

The rod 95, which actuates the control rods and which is connected to earth, carries one of the contact members, for example a hollow elastic contact 99 surrounding the other contact 100, the latter being carried in the socket 94 and being connected to a conductor 101. The operation of the assembly 91—95 with contacts 99—100 is clearly shown in Figs. 8 and 9. It will be appreciated that with the arrangement shown in Figs. 8 and 9, a number of various advantages is obtained, and especially the absence of vibration due to the short length of the lever 90, the simplicity of the electric wiring which has no need to pass through the floor of the vehicle, and also the elimination of accidental operation of the contact when the user inadvertently touches the gear lever with no intention of changing its position. In fact, the lever 90 is only moved when the gear-changing lever is itself displaced in the direction of engagement or of disengagement of a gear.

It will of course be understood that the various forms of embodiment described with reference to Figs. 1 to 7 are applicable to the lever 90 of Figs. 8 and 9.

Figure 10:
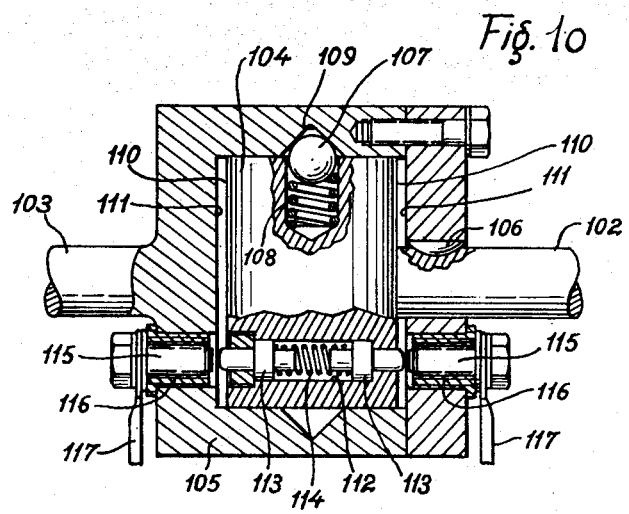
Figs. 10 and 11 are concerned with further alternative forms of embodiment.

Reference will now be made to Fig. 10 in which there can be seen at 102 and 103 a rod or lever for actuating the sliding gears of the gear-box, this rod being itself actuated from the gear-changing lever. The rod 102—103 is provided in two parts 102 and 103, one of which is located after and forming an extension of the other. The part 102 is rigidly fixed to a piston 104 which is slidably mounted in a cylinder 105 fast with the other part 103. The piston 104 is prevented from rotating in the cylinder 105 by means of a suitable key 106. A ball 107 arranged in a radial hole of the piston 104 is urged towards the exterior by a spring 108 and co-operates with a groove 109 of triangular section, formed in the internal wall of the cylinder 105 and tends to bring the piston 104 back to a central position at which each of the extreme transverse faces 110 of the piston is spaced apart by the same small distance from the corresponding transverse face 111 of the cylinder 105. This small distance is chosen to be less than the axial projection of the useful travel of the ball 107 along the corresponding slope of the groove 109 having a triangular section, so that the return of the piston 104 towards the central position under the action of the ball 107 is effected with certainty.

In the piston 104 is formed a drilled bore 112 which is eccentric but parallel to the axis, and in which are engaged two moving members 113, arranged symmetrically. These members 113 are pushed towards the exterior by a spring 114, moving apart from each other and coming into abutment against a shoulder of the bore 112 and against a locking plug which is engaged in this bore. In this position of abutment, the external extremities of the members 113 pass beyond the faces 110 and are intended to co-operate with members 115 fixed in an insulated manner at 116 in the transverse walls of the cylinder and of its detachable cover, which are both indicated by 105.

The members 113 form the earthed contacts of a double-acting electric switch, the other contacts of which are constituted by the members 115. The latter are connected to conductors 117 which are connected together and supplied with current, preferably through the intermediary of the coil of a relay.

When the control is in the position of rest, the ball 107 is urged by the spring 108 into the groove 109 and holds the piston 104 centered in a well-defined intermediate position in the cylinder 105. The contacts are open at 113—115. When a change of gear is to be made, the member 102 is pushed towards the member 103 or pulled away from it, and one face 110 is applied against the face 111 corresponding to ensure a positive mechanical drive of the member 103 by the member 102. Before the faces 110 and 111 are applied together, however, one of the contacts 113—115 closes and this controls the declutching. The spring 114 permits a suitable withdrawal of the contact 113 into the bore 112 between the moment of application to each other of the contacts 113 and 115 and the moment at which the faces 110 and 111 are applied together. When the control force is released, the piston is brought back into the defined central position at which the contacts 113—115 are opened.

Figure 11:
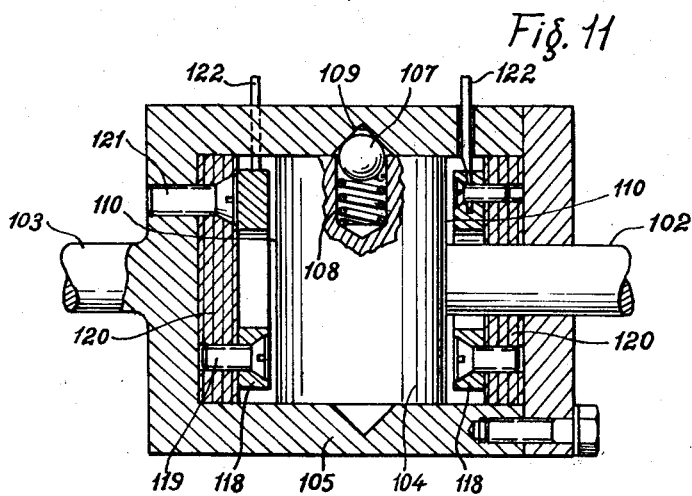

In the alternative form of embodiment shown in Fig. 11, the arrangement is similar to that which has been described above with reference to Fig. 10, and there will again be seen at 102 and 103 the parts of the rod system, with the piston at 104, the cylinder and its detachable cover at 105, the ball at 107 with the spring 108 and the groove 109. The arrangement of the contacts is however different, and there are shown at 118 two contacts fixed respectively to the two transverse walls of the cylinder 105. Each contact 118 has the shape of an annular ring of large section and is fixed by means of screws 119 on an insulating disc 120, which is itself fixed by screws 121 to the transverse walls of the cylinder 105. The contacts 118 are connected to conductors 122 connected to each other and to a source of current, preferably through the intermediary of the coil of a relay. The piston 102 is connected to earth and forms by its faces 110 a contact with each of the two contacts 118.

When the control is in the position of rest, the ball 107 acts as before to hold the piston 104 centered in the intermediate position inside the cylinder. The contacts 118 remain insulated from earth. When a change of gear is to be made, the member 102 is pushed towards the member 103 or drawn away from it, and one face 110 comes into application against the corresponding contact 118, thus ensuring the mechanical drive of the member 103, and closes at the same time one of the contacts 110—118. When the actuating force is released, the piston is brought back to the central position by the ball 107. It will be noted that the contacts 118 are of large cross-section and can withstand heavy currents.

What we claim is:

1. An electrical switch structure comprising a first member, a second member, said first member being mounted movably with respect to said second member over a limited travel starting from a central position of rest, abutment means on each said member for insuring that beyond said limited travel the second member is rigid with said first member, elastic means for restoring said first member to a central position of rest, a first rigid elastic contact rigidly carried by one of said members, a second electric rigid contact, said both contacts forming a switch, said second contact being mounted rockable on the other member, and a spring means between said last mentioned contact and member.

2. A structure as claimed in claim 1 wherein said second contact and said other member form two parts arranged end to end and said spring means is a helical spring coaxial with said parts.

3. An electrical switch structure comprising a first member, a second member, said first member being mounted movably with respect to said second member over a limited travel, abutment means on each of said members for insuring that beyond said limited travel the second member is rigid with the first member, two contact elements constituting a switch and being carried from said two members respectively, one of said elements being rigid with its corresponding member while the other element has two parts arranged end to end, one of said parts being rigid with the other member, and a spring means for coupling the other part to the first mentioned part.

4. A structure as defined in claim 3, wherein one of said parts has a peripheral annular plane surface and a central projection while the other part has a peripheral annular plane surface and a central depression, said surfaces being in application with each other and said projection extending within said depression.

5. A structure as defined in claim 4, wherein the spring means coupling the two parts surrounds these parts and is retained at its end portions thereon respectively, while a central portion of the spring means is free and capable of gapping.

6. A system as defined in claim 4, wherein the spring means coupling the two parts surrounds said parts and is screwed at its end portions on threaded sections thereof, while a central portion of the spring means is free and capable of gapping.

7. A system as defined in claim 4, wherein the spring means coupling the two parts surrounds said parts and is fitted at its end portions on cylindrical sections thereof, comprising grooves on said sections for receiving the end convolutions of said spring, and frusto-conical sections on said parts for freeing a central portion of the spring means and rendering said central portion capable of gapping.

8. An electrical switch structure comprising a first member, a second member, said first member being mounted movably with respect to said second member over a limited travel, abutment means on each of said members for insuring that beyond said limited travel said second member is rigid with said first member two contact elements constituting a switch and being carried from the two members respectively, one of said elements being rigid with its corresponding member, the other element being mounted rockable on the other member, and a spring means between said last mentioned element and member.

References Cited in the file of this patent
UNITED STATES PATENTS

| | | |
|---|---|---|
| 2,622,711 | Chambonneau | Dec. 23, 1952 |
| 2,635,722 | Wemp | Apr. 21, 1953 |
| 2,732,447 | Findley | Jan. 24, 1956 |
| 2,813,942 | Binder | Nov. 19, 1957 |